(12) United States Patent
Hu et al.

(10) Patent No.: US 6,221,835 B1
(45) Date of Patent: Apr. 24, 2001

(54) HIGH DENSITY ZEOLITES AND THEIR PRODUCTION

(75) Inventors: Patrick C. Hu, Baton Rouge; Conrad J. Langlois, Jr., New Roads; Dixie E. Goins, Baton Rouge, all of LA (US); Joseph E. Coury, Friendswood, TX (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 09/344,467

(22) Filed: Jun. 25, 1999

(51) Int. Cl.$^7$ .............................. C11D 7/20; C01B 39/02; B01J 29/04
(52) U.S. Cl. .................... 510/507; 510/477; 510/512; 510/532; 510/533; 423/700; 423/701; 423/714; 502/62; 502/85
(58) Field of Search .................................. 510/507, 477, 510/512, 532, 533; 423/700, 701, 714; 502/85, 62

(56) References Cited

U.S. PATENT DOCUMENTS

| | | | | |
|---|---|---|---|---|
| 4,732,880 | * | 3/1988 | Ugo et al. ........................... | 502/62 |
| 5,076,957 | * | 12/1991 | Diehl et al. ..................... | 252/174.24 |
| 5,378,670 | * | 1/1995 | Kumar .................................. | 502/60 |
| 5,756,792 | * | 5/1998 | Lukes et al. ......................... | 556/405 |
| 5,929,018 | * | 7/1999 | Baillely et al. ...................... | 510/392 |
| 5,981,417 | * | 11/1999 | Drake .................................... | 502/64 |
| 6,004,896 | * | 12/1999 | Addiego .............................. | 502/64 |

FOREIGN PATENT DOCUMENTS

| | | |
|---|---|---|
| 0357989 | 3/1990 | (EP) . |
| 0 448 298 | * 9/1991 | (EP) . |
| 0569626 | 11/1993 | (EP) . |
| 55-027818 | * 2/1980 | (JP) . |
| 02129016 | * 5/1990 | (JP) . |
| 91/12031 | * 8/1991 | (WO) . |
| 94/21378 | * 9/1994 | (WO) . |
| 0015553 | 3/2000 | (WO) . |
| 0015709 | 3/2000 | (WO) . |

* cited by examiner

*Primary Examiner*—Lorna M. Douyon
(74) *Attorney, Agent, or Firm*—E. E. Spielman, Jr.

(57) ABSTRACT

Novel synthetic zeolite compositions of extremely small particle sizes that have increased loading capability, and process technology for producing such compositions are described. So far as is presently known, it has never been possible to form such compositions heretofore. The process technology involves, inter alia, contacting the zeolite cake formed in its production with a specified type of treating agent and then subjecting the treated zeolite to physical subdivision.

20 Claims, No Drawings

HIGH DENSITY ZEOLITES AND THEIR PRODUCTION

BACKGROUND

Type-A zeolite has been used for many years as a major component in powder detergents. It has long been known in the art that if the zeolite has an alkalinity above normal, such higher alkalinity can be easily addressed by adjusting the acidic compounds in spray dry crutch operations.

It is common practice to ship type-A zeolite in powder form to the detergent manufactures by railcar. A long standing goal in the art has been the development of an effective way of increasing the loading capability of the zeolite per unit volume of container space. In this way it would be possible for a greater quantity of the zeolite product to be carried in a railcar or other shipping container or vessel. In addition, larger quantities of the zeolite could be stored in silos or other storage vessels both at the site of the manufacturer and at the site of the detergent producers.

Type-A zeolite particles typically range in size from about 1 micron to about 40 microns. In preliminary studies connected with this invention it was discovered that if dry particulate type-A zeolite is subjected to size reduction in, say, a hammer mill, some increase in loading capability per unit volume of container space can be achieved. However, there is a limit to which such particles can be subdivided in this manner. Once the particles reach a sufficiently small size, they tend to agglomerate and thereby form particles which are below, but which nevertheless approach, the particle size before milling or grinding.

It is thus a principal objective of this invention to find a way of increasing the loading capability of zeolite per unit volume of container space, especially in the case of type-A zeolite. It would be particularly advantageous if this objective could be achieved without any material adverse effect upon the properties of the zeolite for end use application in the manufacture of powder detergents.

THE INVENTION

This invention is deemed to fulfill the foregoing objective in a highly effective manner. Indeed, it has been found possible to accomplish the objective while at the same time improving upon other properties of type-A zeolite for usage as a detergent builder in powder detergents. Thus in addition to increased loading capability, the type-A zeolites of this invention, if properly prepared, normally will possess improved performance in at least one of the following additional properties: lack of particles larger than 30 microns, increased calcium depletion rate, and/or decreased alkalinity.

In one of its embodiments this invention provides a process of increasing the loading capability of a zeolite, which process comprises:

a) contacting water-wet zeolite filter cake while on the filter or after removal from the filter with a treating agent to form a mixture containing treating agent, water, and zeolite, the treating agent being a substance capable of transferring protons to one or more bases that exist in the mixture, the amount of treating agent being sufficient to cause a detectable decrease in the pH of the mixture, but insufficient to reduce the pH of the mixture to below about 11;

b) either (i) drying the mixture from a), or (ii) mixing a sufficient amount of dry zeolite powder with the wet mixture from a) to form a more readily handleable wet blend, and drying the wet blend; and c) physically subdividing dried zeolite from b) to form a finely-divided zeolite that is devoid, or at least substantially devoid, of any particles larger than about 30 microns, and preferably that is devoid, or at least substantially devoid, of any particles larger than about 20 microns.

The term "substantially devoid" as used herein, means that the zeolite composition formed by the process contains, if any, no more than about 3 wt % of particles greater than 30 microns in size, and preferably no more than about 3 wt%, if any, of particles greater than 20 microns in size. Even more preferably, no more than 3 wt % of the particles, if any, are of a size greater than 10 microns. It is interesting to note that this invention has made it possible to provide laboratory produced zeolite compositions having no detectable amount of particles greater than about 6 microns in size.

In another embodiment of this invention the treating agent is added to the filter cake while the filter cake remains on the filter, the treated filter cake is then removed from the filter and then steps b) and c) above are carried out.

A further embodiment is a process of increasing the loading capability of a zeolite, which process comprises:

a) removing the filter cake from the filter, preferably after it has been washed with water;

b) forming a stirrable mixture of the removed zeolite and water, said mixture having a pH above about 11;

c) introducing into, and thoroughly dispersing within, said mixture a substance capable of transferring protons to one or more bases that exist in the mixture, the amount of such substance introduced into the mixture being sufficient to produce a detectable decrease in the pH of the mixture, with the proviso that the pH of the mixture does not fall below about 11;

d) either (i) drying the mixture from c), or (ii) mixing a sufficient amount of dry zeolite powder with the wet mixture from b) to form a more readily handleable wet blend, and drying the wet blend; and e) physically subdividing dried zeolite from d) to form a finely-divided zeolite that is devoid, or at least substantially devoid, of any particles larger than 30 microns, and preferably that is devoid, or at least substantially devoid, of any particles larger than about 20 microns.

For convenience, the substance having the ability to transfer protons to one or more bases present in the initial zeolite mixtures is sometimes referred to hereinafter as the "treating agent."

Still another embodiment of this invention is a composition which comprises (i) a synthetic zeolite, preferably a type-A zeolite, and (ii) from about 0.2 to about 4.5 wt%, and preferably from about 0.2 to about 1.5 wt%, based on the total weight of (i) and (ii), of an electrolyte. Such electrolyte results from the introduction into the zeolite cake formed during the production of the zeolite, of a substance which transferred protons to one or more bases that existed in the zeolite filter cake formed during the production of the zeolite. In other words, the treating agent used in forming such zeolite composition is the precursor of the electrolyte which is present in the above composition.

Further embodiments of this invention provide synthetic zeolite compositions, preferably type-A zeolite compositions, in which the composition contains no more than about 3 wt % of particles greater than 30 microns in size, and preferably no more than about 3 wt % of particles greater than 20 microns in size. In still further embodiments of this invention, there are provided a synthetic zeolite composition, preferably a type-A zeolite composition, in which no more than about 3 wt % of the particles are of a size greater than 10 microns.

Preferred compositions of this invention comprise in combination (i) a synthetic zeolite, preferably a type-A zeolite, and (ii) from about 0.2 to about 4.5 wt%, and preferably from about 0.2 to about 1.5 wt%, based on the total weight of (i) and (ii), of an electrolyte formed from a treating agent which, before inclusion in said mixture, was capable of transferring protons to one or more bases that existed in the zeolite filter cake formed during the production of the zeolite, the composition being further characterized in that the composition contains no more than about 3 wt% of particles greater than 30 microns in size, more preferably no more than about 3 wt %of particles greater than 20 microns in size, and most preferably no more than about 3 wt %of particles greater than 10 microns in size.

So far as is presently known, it has been impossible to produce any of the compositions of this invention prior to this invention.

As is well known in the art, zeolite is formed by mixing sodium hydroxide, sodium aluminate, and sodium silicate in water to produce a gel-phase. The gel-phase is transferred into a crystallizer in which a slurry of a crystalline zeolite product is formed. The slurry is then filtered to produce a filter cake, which typically is washed with water while on the filter to remove the alkaline mother liquor. Such filter cake, preferably after water washing, is used as the starting material in the process of this invention. Anyone desiring further details concerning zeolite manufacture including formation of the filter cake, can refer to the vast body of literature on the subject, such as, for example, the book by Donald W. Breck, entitled *Zeolite Molecular Sieves*, originally published in 1973 by Jolm Wiley & Sons, New York, with copyright in 1974 to John Wiley & Sons, and reprinted by arrangement, by Robert E. Krieger Publishing Company, Malabar, Florida, in 1984 with corrections and revisions therein, and references cited therein.

Another good way of establishing and repeatably achieving the addition of the proper amount of the treating agent to the mixture from a) above, is to make use of alkalinity as expressed in terms of wt %of $Na_2O$ based on the weight of the dried product. The procedure used involves making one or more initial pilot experiments wherein a known calculated amount of the particular treating agent to be used is added to the mixture produced in a) above from a known amount of representative sample of filter cake from the production process, and the remainder of the above process steps of this invention are carried out. Typically the amount of treating agent used should be the amount calculated to neutralize about 0.1 to about 0.5 wt %of the alkalinity expressed as weight percent $Na_2O$ based on the weight of the dried product. The finished dried zeolite product from the pilot experiment(s) is subjected to an analytical procedure described below which enables the determination of the actual alkalinity expressed as wt %of $Na_2O$ based on the weight of the dried product. The data from such pilot experiment(s) are used to determine the actual wt $%Na_2O$ alkalinity. Adjustment in the amount of the treating agent is then made, if necessary, in order to achieve the desired wt $%Na_2O$ alkalinity in the mixture in b).

The full details of the procedure to be used for determining alkalinity expressed in terms of wt $%Na_2O$ are as follows: Exactly one gram of zeolite powder is dispersed in 100 mL of water contained in a 500 mL beaker. The slurry is agitated with a 2-inch magnetic stirring bar at room temperature for 2 hours at 300 rpm. The slurry is then filtered through 0.45 micron filter paper. The filtrate is titrated to neutrality with dilute hydrochloric acid of known concentration. If zeolite filter cake is to be subjected to this procedure, it should first be dried to remove the free water before the alkalinity determination. In this connection, the term "free water" refers to all water in the zeolite except for its water of hydration.

In practicing this invention it is desirable to use an amount of treating agent relative to the amount of filter cake that will neutralize from about 5% to about 95% of the alkalinity expressed as wt $%Na_2O$, such alkalinity being determined, if and when necessary, by use of the foregoing analytical procedure. Thus another embodiment of this invention is a process as described above except that in b) the amount of the treating agent introduced into, and thoroughly dispersed within, the mixture from a) is that which is sufficient to neutralize from about 5% to about 95% of the alkalinity of the aqueous filtrate as determined, if and when necessary, by use of the foregoing analytical procedure.

Other embodiments and features of this invention will be still further apparent from the ensuing description and appended claims.

The Zeolite Filter Cake

The origin of the filter cake has been described above. The particular details of how the zeolite was prepared is not part of this invention as long as the zeolite is amenable to processing using the process technology of this invention. The zeolite is most preferably is a type-A zeolite. However the process of this invention can be applied to other types of synthetic zeolite, such as types-X, -Y, -MAP (Maximum Aluminum Type-P), and -ZSM5.

If desired, the filter cake can be subjected to one or more pretreatments before the treating agent is brought into contact therewith. Usually these pretreatments are applied to the zeolite cake after it has been removed from the filter. Such pretreatments are not required, but can prove beneficial.

One optional way of processing the zeolite filter cake before contacting it with the treating agent is to form a stirrable mixture of the zeolite with water. Such preliminary processing is desirable when a more acidic treating agent is to be used, as water dilution will minimize the possibility of zeolite degradation. Another way of conducting optional preliminary processing is to mix dry zeolite powder with the zeolite cake to form a wet flowable mixture. In either case, the stirrable mixture of zeolite and water will have a pH above 11, and usually above 12.

When forming such stirrable mixture, typically the operation is performed at ordinary ambient room temperature although when using additional water, the stirrable mixture can be produced using hot water, if desired.

Treating Agents and the Treatment Operation

As indicated at the outset, the treating agent is a Brønsted acid inasmuch as it has the capability of transferring protons to one or more bases that exist within the mixture formed in step a) of the process. In theory any such substance has the potential of being used as the treating agent. However, the treating agent must not destroy the zeolite or permanently alter its properties in a materially adverse manner. It is preferred to avoid use of Brønsted acids which are reducing agents, and which can react with other detergent ingredients utilized by the detergent manufacturer.

The treating agent can thus be any suitable inorganic or organic Brønsted acid that has no material adverse effect on the zeolite being treated, and on the detergent components with which the zeolite will be blended by the detergent manufacturer. Moreover, the treating agent can be one or more low molecular weight compounds or it can be oligomeric or polymeric in character. The treating agent can be introduced into and mixed with the zeolite cake in neat or undiluted form, or it can be introduced in the form of a solution, slurry, or paste in which the liquid is water and/or other suitable liquid that is not harmful to the zeolite and that will not adversely affect its usefulness in the manufacture of detergent compositions. Illustrative, non-limiting examples of inorganic compounds that may be used as treating agents include, for example, aqueous inorganic acids (e.g., sulfuric acid, phosphoric acid, pyrophosphoric acid, polyphosphoric acid, hydrochloric acid, and carbonic acid), and partially protonated electrolytes (e.g., sodium hydrogen sulfate, sodium monohydrogen phosphate, sodium dihydrogen phosphate, monosodium pyrophosphate, sodium acid tartrate, sodium acid oxalate, sodium bicarbonate, monosodium citrate, and disodium citrate). Illustrative, non-limiting examples of organic compounds and polymeric substances that may be used as treating agents include, for example, organic mono- and polycarboxylic acids that are at least partially soluble in water (e.g., acetic acid, propionic acid, oxalic acid, malic acid, citric acid, and tartaric acid), and polymeric organic acids and partially neutralized polymeric organic acids (e.g., polyacrylic acid, acrylic acid-maleic acid copolymer, partially protonated polyacrylic acid, and partially protonated acrylic acid-maleic acid copolymer), and partially protonated chelating agents (e.g., nitrilotriacetic acid, ethylenediaminetetraacetic acid, carboxymethoxysuccinic acid, and partially protonated derivatives thereof). Mixtures of any two or more treating agents can be employed, and oftentimes it is advantageous to employ such a mixture. Preferred treating agents by virtue of (a) their desirable properties as treating agents in the process of this invention, and (b) the desirable characteristics which they confer upon the ultimate detergent compositions in which the zeolite compositions of this invention are typically employed, include (i) polyacrylic acid, (ii) acrylic acid-maleic acid copolymer, (iii) phosphoric acid, (iv) pyrophosphoric acid, (v) polyphosphoric acid, (vi) citric acid, (vii) carbonic acid, (viii) sulfuric acid, and (ix) any partially neutralized derivative of any of (i) through (viii). When using a polyacrylic acid and/or a copolymer of acrylic and maleic acids, or a partially protonated derivative of either such polymer, the polymer most preferably has a weight average molecular weight of less than about 12,000.

In practice, the treating agent will be added to the zeolite before or after it has been removed from the filter. However, it is permissible to use other ways of bringing these materials together, such as, for example, cofeeding treating agent and a stirrable zeolite slurry or paste, optionally with additional water, to a mixing vessel. If additional water is used, either by cofeeding or otherwise, it will function to reduce the viscosity, and thus improve the stirability, of the resultant mixture.

It is important to ensure that the treating agent is dispersed widely throughout the zeolite. Thus if a slurry or paste has been formed in a preliminary operation, the treating agent should be thoroughly mixed into the slurry or paste in a vessel that is equipped with suitable stirring and/or agitating apparatus. The mixing can be conducted on a batch basis or on a continuous basis. If conducted on a continuous basis, a smaller mixing vessel can be employed. In such case it is preferred to continuously feed into the mixer suitable amounts of treating agent and aqueous zeolite slurry or paste, with or without added water, to subject the resultant mixture to thorough mixing during its residency in the vessel, and to continuously withdraw treated zeolite product from the mixer at a rate that maintains a constant or substantially constant amount of mixture in the mixer during the operation. It is possible to use variants of this procedure. For example, it is possible to feed the treating agent and/or the zeolite slurry or paste to the mixer and to withdraw treated product from the mixer in increments with short intervals of time between injections and concurrent withdrawals, while continuously mixing the contents of the mixer. Thus in the practice of this embodiment of the invention it matters not exactly how the necessary components are brought together and mixed, as long as the requisite materials are brought together in the requisite relative quantities and are thoroughly mixed together so as to produce a treated zeolite that will, when subjected to the remainder of the process, provide a zeolite of this invention having increased packing capability as compared to the zeolite from which it was prepared.

Instead of forming a stirrable slurry or paste of the zeolite, the treating agent can be sprayed or otherwise mixed with the zeolite cake either while it is on the filter or after it has been removed from the filter.

The particular processing used can depend for example on such factors as the consistency of the zeolite cake, the strength and form of the treating agent used, and the type of blending and/or drying equipment available for conducting these operations. Thus, when using a weakly acidic treating agent, it is often unnecessary to add water to the wet zeolite cake. Instead the treating agent, if a liquid, or in solution if a solid, can be sprayed onto the zeolite cake before or after removal from the filter. When the weakly acidic treating agent is a solid, it can be directly blended with the wet zeolite cake in a suitable mechanical blender. On the other hand, when a more acidic treating agent is used, utilization of additional water is desirable in order to minimize the possibility of zeolite degradation. Thus, more acidic treating agents will typically be diluted with water before application to the zeolite, or will be added to an aqueous slurry of the zeolite. With respect to equipment considerations, when the zeolite cake is formed on a press filter, it is desirable to add water to the zeolite cake before or during the addition of the treating agent. On the other hand, if the zeolite cake is formed on a vacuum filter and thus is of a wetter consistency, addition of water during the processing is typically unnecessary, but may be utilized if desired. When spray-drying equipment is used, large amounts of water can be used in the processing in as much as a suitably dilute slurry of the treated product is required in order to avoid pluggage of the spray nozzles. Lesser quantities of water will typically be used when using oven drying or similar drying procedures.

Some of the treating agents useful in the practice of this invention can be formed in situ. For example, acids such as hydrochloric acid, hydrobromic acid, sulfuric acid, or carbonic acid can be produced in situ by introducing hydrogen chloride, hydrogen bromide, sulfur trioxide, or carbon dioxide, respectively, into the wet zeolite cake or into a slurry or pasty mixture of the zeolite and water.

Methods of determining the requisite quantity of a given treating agent with a given quantity of a given zeolite have been described above. Thus if a perceptible drop in pH is used as the indicator that sufficient treating agent has been introduced into and mixed with the aqueous mixture (slurry or paste) of zeolite, a pH meter with electrodes in contact with the mixture can be employed. Use of the analytical procedure given above is another very suitable way of determining the appropriate relative amounts of zeolite and treating agent that should be used. In plant operations in which zeolite of constant reproducible properties is being produced, once the proper proportions of the zeolite and the particular treating agent have been established by use of the analytical procedure, it should be possible to resort to the use of the analytical procedure only occasionally to ensure that no upsets or irregularities have occurred in the overall operation.

Drying Zeolite After Treatment with Treating Agent

The treated zeolite slurry or paste can be dried in various ways. For example, use can be made by use of such drying equipment as a circulating air oven, a vacuum dryer, a spray dryer, a drum dryer, a tray dryer, or the like. The drying temperature used is typically governed by the thermal stability of the treating agent used. Thus when using a treating agent of high thermal stability, temperatures as high as about 300° C. can be employed. On the other hand, if the treating agent is relatively thermally unstable, drying temperatures that avoid thermal degradation of the treating agent will be employed (e.g., up to about 115° C.).

Physical Subdivision of the Dried Zeolite

Any appropriate apparatus for causing particle size reduction can be used for this purpose. Thus recourse can be had to use of a hammer mill, a mechanical grinder, or any other equipment that can pulverize the dried zeolite to a sufficiently small particle size. The grinding or milling operation is continued at least until there is essentially no zeolite with a particle size above 325 U.S. mesh (42-micron mesh size), and preferably until there is essentially no zeolite with a particle size greater than 100 U.S. mesh. Preferred type-A zeolite of this invention is devoid, or at least substantially devoid, of particles larger than 30 microns, and more preferably the type-A zeolite is devoid, or at least substantially devoid, of particles larger than 20 microns. For the purposes of this invention, determination of particle size in units of microns is carried out by use of a Coulter® Multisizer with the particles in an aqueous medium. It is to be noted that the production of type-A zeolite in which over 99.5 wt %of the particles are of such minute particle size has not been possible heretofore because of the inherent characteristic of small particles of prior type-A zeolite to agglomerate essentially as soon as such small particles were formed in the body of the zeolite being ground or milled.

EXAMPLES

The following numerical Examples illustrate the practice and advantages of this invention. Lettered Comparative Examples are also presented so that the advantages resulting from the practice of this invention can be even more fully appreciated, particularly by those who may be unfamiliar with the technology here involved. These examples are not intended to constitute, and should be construed as constituting, limitations on the scope of this invention.

Comparative Examples A–D

Particle size determinations using the Coulter Multisizer were carried out on samples of a commercial type-A zeolite powder both before and after milling the powder in the 6-inch laboratory hammer mill. The results of these determinations are summarized in Table 1. Comparative Example A involves particle size determination of the commercial zeolite powder as received, and the values given are the averaged results from determinations on two separate samples of the powder. The product of Comparative Example B had been subjected to one pass through the hammer mill. The products of Comparative Examples C and D had been subjected to two and three passes through the mill, respectively. The numerical values given in Table 1 are in terms of the mean particle size, and of specified percentages of the powder that were less than the size (in microns) specified in the left column of the Table. For example, in Comparative Example A, the mean particle size was 3.486, and 10% of the particles were of a size less than 0.817 microns.

TABLE 1

| Particle Size, μm | Comparative Example A | Comparative Example B | Comparative Example C | Comparative Example D |
| --- | --- | --- | --- | --- |
| mean | 3.486 | 3.136 | 3.126 | 3.182 |
| 10% is less than | 0.817 | 0.757 | 0.903 | 0.854 |
| 25% is less than | 1.726 | 1.631 | 1.722 | 1.711 |
| 50% is less than | 2.970 | 2.640 | 2.785 | 2.747 |
| 75% is less than | 4.596 | 4.129 | 4.230 | 4.197 |
| 90% is less than | 6.387 | 5.613 | 5.614 | 5.615 |

The results given in Table 1 show that physical subdivision of the zeolite samples using a hammer mill can result in an overall particle size reduction of only about 10%, even after three passes through the mill.

Examples 1–3

Samples of commercial type-A zeolite filter cake received from a commercial production plant were homogenized with a high speed agitator to form a soft paste. A portion of the paste (2500 grams) was transferred to a Hobart mixer. A 10 wt %aqueous solution of a treating agent of this invention was sprayed onto the sample while agitating the sample in the mixer. Then 2500 grams of dry commercial zeolite powder from the same commercial plant was blended with the sample. The resultant blend was transferred to a twin-shell blender equipped with a high speed mixing bar. The powder/treated paste mixture was thoroughly mixed in the blender to form a "wet" powder. About 1000 grams of the wet powder was then dried in an oven, either under air or under a carbon dioxide environment, at 115° C. for 8 hours. The dried zeolite was milled by passing it once through a conventional 6-inch diameter laboratory hammer mill. Three samples of treated type-A zeolite were formed in this manner. The sample of Example 1 was prepared pursuant to this invention by use of citric acid treatment, followed by drying and one pass through the hammer mill. This sample contained 0.75 wt %of citric acid on a dry basis. The sample of Example 2 was made in the same manner as that of Example 1 except that the treating agent was pyrophosphoric acid used in an amount such that the finished sample contained 0.66 wt %of the acid on a dry basis. The sample of Example 3 was in the same way as that of Example 1 except that the treating agent used was sodium bisulfate (Na$_2$HSO$_4$). In this case the finished sample contained 1.64 wt %of the treating agent on a dry basis. X-ray diffraction analyses revealed that none of the treating agents caused a reduction in zeolite crystallinity. For comparative purposes, one sample was formed in the above manner but without use of a treating agent or milling (Comparative Example E). Another sample (Comparative Example F) was formed by milling a portion of Comparative Example E without use of a treating agent. Another sample (Comparative Example G) was treated with citric acid using the above procedure but the sample was not milled. The finished sample of Comparative Example G contained 0.75 wt %of citric acid on a dry basis.

The results of these experiments are summarized in Table 2.

TABLE 2

| Particle Size, μm | Comparative Example E No treating agent or milling | Comparative Example F Milled, but no treating agent | Comparative Example G Citric acid treatment, but no milling | Example 1 Citric acid treatment and milling | Example 2 Pyrophosphoric acid treatment and milling | Example 3 Sodium bisulfate treatment and milling |
|---|---|---|---|---|---|---|
| mean | 3.757 | 2.992 | 6.083 | 1.808 | 2.184 | 2.136 |
| 10% or less | 0.644 | 0.576 | 0.879 | 0.580 | 0.687 | 0.676 |
| 25% or less | 1.669 | 1.575 | 1.736 | 1.144 | 1.276 | 1.257 |
| 50% or less | 2.763 | 2.499 | 2.997 | 1.825 | 2.026 | 1.978 |
| 75% or less | 4.461 | 3.892 | 5.254 | 2.494 | 3.022 | 2.924 |
| 90% or less | 6.742 | 5.367 | 14.9 | 2.944 | 3.950 | 3.861 |

It can be seen from the data in Table 2 that the processing pursuant to this invention gave dramatic reductions in particle size, especially on the large particle fractions. The data also shows that neither the treating agent without milling or milling without the treating agent is capable of approaching the excellent results achievable by the practice of this invention.

Example 4

In order to demonstrate the extraordinary improvement in packing capability of the zeolites of this invention as compared to the zeolites from which they are made, a series of tapping experiments were carried out. In these tests, 30-gram samples of zeolites to be tested were dropped into a 100 mL graduated glass cylinder. The cylinders were then placed on a tapping machine which slowly elevates the cylinder by a prescribed distance (approximately 1 inch) and then followed by a free-drop. Each such cycle is counted by the machine. At periodic intervals during the test, the volume of the cylinder contents is recorded. The samples tested in this manner were separate portions of the respective zeolites of Examples 1–3. For comparative purposes, samples of the commercial zeolite as received, and also after milling were subjected to this tapping procedure. The results of these experiments in terms of grams of zeolite powder per mL are summarized in Table 3. Thus the greater the density, the better the result.

TABLE 3

| Example | No taps | 400 taps | 800 taps | 1200 taps |
|---|---|---|---|---|
| Comparative Example A | 0.42 | 0.56 | 0.625 | 0.68 |
| Comparative Example B | 0.46 | 0.57 | 0.67 | 0.70 |
| Example 1 | 0.51 | 0.71 | 0.79 | 0.82 |
| Example 2 | 0.49 | 0.69 | 0.78 | 0.81 |
| Example 3 | 0.50 | 0.68 | 0.75 | 0.80 |

It can be seen from the data in Table 3 that the zeolites of this invention had improvements in packing density in the range of from about 15 to about 20%.

Other experiments showed that the products of Examples 1–3 had superior rate of calcium exchange and significantly reduced alkalinity as compared to the corresponding zeolites from which they were prepared.

Compounds referred to by chemical name or formula anywhere in this document, whether referred to in the singular or plural, are identified as they exist prior to coming into contact with another substance referred to by chemical name or chemical type (e.g., another component, a solvent, or etc.). It matters not what preliminary chemical changes, if any, take place in the resulting mixture or solution, as such changes are the natural result of bringing the specified substances together under the conditions called for pursuant to this disclosure. Also, even though the claims may refer to substances in the present tense (e.g., "comprises," "is," etc.), the reference is to the substance as it exists at the time just before it is first contacted, blended or mixed with one or more other substances in accordance with the present disclosure.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A process of increasing the loading capability of a synthetic zeolite selected from the group consisting of type-A zeolite, type-X zeolite, type-Y zeolite, type-MAP zeolite and type-ZSM5 zeolite for use as a detergent builder in powder detergents, which process comprises the sequential steps of:

a) contacting the synthetic zeolite filter cake, which is water-wet, while on the filter or after removal from the filter, with a treating agent to form a mixture containing treating agent, water, and the synthetic zeolite, the treating agent being a substance capable of transferring protons to one or more bases that exist in the mixture, the amount of treating agent being sufficient to cause a detectable decrease in the pH of the mixture, but insufficient to reduce the pH of the mixture to below about 11;

b) either (i) drying the mixture from a), or (ii) mixing a sufficient amount of dry synthetic zeolite powder with the wet mixture from a) to form a more readily handleable wet blend, and drying the wet blend; and c) grinding or milling dried zeolite from b) to form a finely-divided synthetic zeolite that is devoid, or at least substantially devoid, of any particles larger than 30 microns.

2. A process according to claim 1 wherein in a) the treating agent is sprayed onto the water-wet zeolite filter cake while the filter cake is on the filter.

3. A process according to claim 1 wherein in a) the treating agent is thoroughly mixed with the zeolite after the zeolite has been removed from the filter.

4. A process according to claim 1 wherein in c) the dried zeolite is subdivided by milling.

5. A process according to claim 1 wherein said zeolite is a type-A zeolite.

6. A process according to claim 5 wherein in a) the treating agent is sprayed onto the water-wet zeolite filter cake while the filter cake is on the filter; and wherein in c) the dried zeolite subdivided by milling.

7. A process according to claim 5 wherein in a) the treating agent is thoroughly mixed with the zeolite after the zeolite has been removed from the filter; and wherein in c) the dried zeolite is subdivided by milling.

8. A process according to claim 1 or 5 wherein said finely divided zeolite is devoid, or at least substantially devoid, of any particles larger than 20 microns.

9. A process according to claim 1 or 5 wherein the treating agent is a polyacrylic acid, a partially protonated polyacrylic acid, an acrylic acid-maleic acid copolymer, a partially protonated acrylic acid-maleic acid copolymer, or a mixture of any two or more of the foregoing.

10. A process according to claim 1 or 5 wherein the treating agent is phosphoric acid, a partially protonated phosphoric acid, pyrophosphoric acid, a partially protonated pyrophosphoric acid, a polyphosphoric acid, a partially protonated polyphosphoric acid, or a mixture of ally two or more of the foregoing.

11. A process according to claim 1 or 5 wherein the treating agent is citric acid, a partially protonated citric acid, carbonic acid, a partially protonated carbonic acid, sulfuric acid, a partially protonated sulfuric acid, or a mixture of any two or more of the foregoing.

12. A process according to claim 1 or 5 wherein the treating agent is (i) a polyacrylic acid that has a weight average molecular weight of less than about 10,000, (ii) a partially protonated polyacrylic acid in which the weight average molecular weight of the corresponding unprotonated polymer is less than about 10,000, (iii) an acrylic acid-maleic acid copolymer that has a weight average molecular weight of less than about 10,000, (iv) a partially protonated acrylic acid-maleic acid copolymer in which the weight average molecular weight of the corresponding unprotonated polymer is less than about 10,000, or (v) a mixture of any two or more of the foregoing; and wherein said finely divided zeolite is devoid, or at least substantially devoid, of any particles larger than 20 microns.

13. A process according to claim 1 or 5 wherein the treating agent is phosphoric acid, a partially protonated phosphoric acid, pyrophosphoric acid, a partially protonated pyrophosphoric acid, a polyphosphoric acid, a partially protonated polyphosphoric acid, or a mixture of any two or more of the foregoing; and wherein said finely divided zeolite is devoid, or at least substantially devoid, of any particles larger than 20 microns.

14. A process according to claim 1 or 5 wherein the treating agent is citric acid, a partially protonated citric acid, carbonic acid, a partially protonated carbonic acid, sulfuric acid, a partially protonated sulfuric acid, or a mixture of any two or more of the foregoing; and wherein said finely divided zeolite is devoid, or at least substantially devoid, of any particles larger than 20 microns.

15. A process of increasing the loading capability of a synthetic zeolite selected from the group consisting of type-A zeolite, type-X zeolite, type-Y zeolite, type-MAP zeolite and type-ZSM5 zeolite for use as a detergent builder in powder detergents, which process comprises the sequential steps of:

a) removing a filter cake of the synthetic zeolite from a filter;

b) forming a stirrable mixture of the zeolite removed in a) and water, said mixture having a pH above about 11;

c) introducing into, and thoroughly dispersing within, said mixture a substance capable of transferring protons to one or more bases that exist in the mixture, the amount of such substance introduced into the mixture being sufficient to produce a detectable decrease in the pH of the mixture, with the proviso that the pH of the mixture does not fall below about 11;

d) either (i) drying the mixture from c), or (ii) mixing a sufficient amount of dry synthetic zeolite powder with the wet mixture from b) to form a more readily handleable wet blend, and drying the wet blend; and e) grinding or milling dried zeolite from d) to form a finely-divided synthetic zeolite that is devoid, or at least substantially devoid, of any particles larger than 30 microns.

16. A process according to claim 15 wherein said finely divided zeolite is devoid, or at least substantially devoid, of any particles larger than 20 microns.

17. A process according to claim 15 wherein the zeolite is a type-A zeolite.

18. A process according to claim 17 wherein the treating agent is (i) a polyacrylic acid that has a weight average molecular weight of less than about 10,000, (ii) a partially protonated polyacrylic acid in which the weight average molecular weight of the corresponding unprotonated polymer is less than about 10,000, (iii) an acrylic acid-maleic acid copolymer that has a weight average molecular weight of less than about 10,000, (iv) a partially protonated acrylic acid-maleic acid copolymer in which the weight average molecular weight of the corresponding unprotonated polymer is less than about 10,000, or (v) a mixture of any two or more of the foregoing.

19. A process according to claim 17 wherein the treating agent is phosphoric acid, a partially protonated phosphoric acid, pyrophosphoric acid, a partially protonated pyrophosphoric acid, a polyphosphoric acid, a partially protonated polyphosphoric acid, or a mixture of any two or more of the foregoing.

20. A process according to claim 17 wherein the treating agent is citric acid, a partially protonated citric acid, carbonic acid, a partially protonated carbonic acid, sulfuric acid, a partially protonated sulfuric acid, or a mixture of any two or more of the foregoing.

* * * * *